United States Patent
Verlodt et al.

(10) Patent No.: US 11,794,453 B2
(45) Date of Patent: *Oct. 24, 2023

(54) MULTILAYER FILM WITH CYCLIC OLEFIN SEAL LAYER

(71) Applicant: Amcor Flexibles Kreuzlingen AG, Kreuzlingen (CH)

(72) Inventors: Ingeborg Verlodt, Lovendegem (BE); Tony Malfait, Rollegem-Kapelle (BE)

(73) Assignee: Amcor Flexibles Kreuzlingen AG, Kreuzlingen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/058,072

(22) PCT Filed: Feb. 18, 2019

(86) PCT No.: PCT/EP2019/053973
§ 371 (c)(1),
(2) Date: Nov. 23, 2020

(87) PCT Pub. No.: WO2019/223910
PCT Pub. Date: Nov. 28, 2019

(65) Prior Publication Data
US 2021/0213722 A1    Jul. 15, 2021

(30) Foreign Application Priority Data

May 23, 2018 (EP) .................................... 18173727

(51) Int. Cl.
B32B 27/08 (2006.01)
B32B 7/06 (2019.01)
B32B 27/32 (2006.01)
C08L 45/00 (2006.01)

(52) U.S. Cl.
CPC ............... B32B 27/08 (2013.01); B32B 7/06 (2013.01); B32B 27/325 (2013.01); C08L 45/00 (2013.01); B32B 2250/02 (2013.01); B32B 2270/00 (2013.01); B32B 2307/31 (2013.01); B32B 2307/54 (2013.01); B32B 2307/702 (2013.01); B32B 2307/732 (2013.01); B32B 2307/748 (2013.01); B32B 2439/00 (2013.01)

(58) Field of Classification Search
CPC ......... B32B 27/08; B32B 7/06; B32B 27/325; B32B 2270/00; B32B 2307/31; B32B 27/36; B32B 2439/80; B32B 27/12; B32B 2262/0276; B32B 2262/0284; C08L 2205/025; C08L 23/0823; C08L 45/00; C09J 145/00
See application file for complete search history.

(56) References Cited

U.S. PATENT DOCUMENTS

| | | | |
|---|---|---|---|
| 4,918,133 A * | 4/1990 | Moriya | C08L 23/0823 524/518 |
| 4,948,856 A | 8/1990 | Minchak et al. | |
| 5,331,057 A | 7/1994 | Brekner et al. | |
| 5,468,803 A | 11/1995 | Takahashi et al. | |
| 5,468,819 A | 11/1995 | Goodall et al. | |
| 6,090,888 A | 7/2000 | Khanarian et al. | |
| 10,899,521 B2 * | 1/2021 | Swamy | A45C 11/005 |
| 10,934,070 B2 * | 3/2021 | Riis | B32B 27/32 |
| 2004/0236024 A1 | 11/2004 | Rivett et al. | |
| 2011/0256373 A1 | 10/2011 | Tatarka et al. | |
| 2011/0308836 A1 * | 12/2011 | Liu | H01B 3/442 174/110 SR |
| 2012/0021151 A1 * | 1/2012 | Tatarka | B32B 27/32 428/35.1 |
| 2012/0071605 A1 | 3/2012 | Baugh et al. | |
| 2015/0259485 A1 | 9/2015 | Kunimoto | |
| 2016/0051020 A1 | 2/2016 | Ansell et al. | |
| 2017/0158400 A1 * | 6/2017 | Priscal | B32B 27/306 |
| 2019/0359405 A1 * | 11/2019 | Swamy | B32B 7/06 |

FOREIGN PATENT DOCUMENTS

| | | | | |
|---|---|---|---|---|
| EP | 1518797 A1 * | 3/2005 | ............ | B32B 27/08 |
| EP | 2644653 A1 | 10/2013 | | |
| JP | 2005254508 A | 9/2005 | | |
| JP | 2007151844 A | 6/2007 | | |
| JP | 2012236382 A | 12/2012 | | |

(Continued)

OTHER PUBLICATIONS

Amcor, Amcor Announces Breakthrough Healthcare Lidding Technology for Combination Products, Aug. 2021, Amcor News Release, downloaded from www.amcor.com. (Year: 2021).*

Leaversuch, New-Generation SEBS Has Processing Advantages, (2003), Plastics Technology, retrieved from www.ptonline.com. (Year: 2003).*

KRATOM (TM) A1535 H Polymer Product Data Document, Mar. 2020, KRATON Polymers. (Year: 2020).*

(Continued)

*Primary Examiner* — Monique R Jackson

(57) ABSTRACT

The present invention is related to a heat-sealable multilayer packaging film comprising:
  a support layer, and
  a peelable seal layer comprising a polymer blend, said polymer blend comprising:
    from 40 to 85% by weight of one or more first amorphous cyclic olefin polymer(s) characterized by a glass-transition temperature of at least 120° C.,
    from 10 to 55% by weight of one or more second amorphous cyclic olefin polymer(s) characterized by a glass-transition temperature of less than 120° C., and
    from 0.5 to 15% by weight, preferably 0.5 to 10% by weight of at least one elastomeric copolymer comprising at least one polymerized monovinylarene and at least one polymerized acyclic olefin.

12 Claims, No Drawings

(56) References Cited

FOREIGN PATENT DOCUMENTS

| | | |
|---|---|---|
| JP | 2014195609 A | 10/2014 |
| WO | 2004080370 A1 | 9/2004 |

OTHER PUBLICATIONS

TOPAS (RTM) 6013F-04 Technical Data Sheet, 2019, TOPAS Advanced Polymers. (Year: 2019).*
TOPAS (RTM) 9903D-10 Technical Data Sheet, 2017, TOPAS Advanced Polymers. (Year: 2017).*

* cited by examiner

MULTILAYER FILM WITH CYCLIC OLEFIN SEAL LAYER

JOINT RESEARCH AGREEMENT

The inventions described and claimed herein were made pursuant to a Joint Research Agreement, in effect on or before the date the inventions were made, between Johnson & Johnson Vision Care, Inc. and Amcor Flexibles Kreuzlingen AG.

FIELD OF THE INVENTION

The present invention is related to a multilayer film having a seal layer comprising a cyclic olefin polymer. Said multilayer film exhibiting a balanced combination of mechanical properties, peel force and chemical inertness. The present invention is also related to packages comprising said film.

STATE OF THE ART

Polymeric films are used in a wide variety of packaging applications, including the packaging of food, pharmaceutical products and non-perishable consumer goods. Depending on their application, a typical combination of properties related to chemical resistance, heat resistance, moisture resistance, elasticity modulus, elongation and tensile strength at break, peel quality and optical properties among others are required.

Particularly in pharmaceutical product packaging applications, it is of major importance that the composition of the content remains substantially unchanged over a reasonable period of time.

One of the reasons responsible for a change of composition is the inadvertent absorption or adsorption of ingredients by the packaging film.

A reduction of such a composition change can be reached through the use of packaging composed of cyclic polyolefin(s).

Cyclic olefin polymers are described in a general manner in numerous patents, including U.S. Pat. Nos. 4,948,856; 5,331,057 and 5,468,819.

Unfortunately, cyclic polyolefin(s) are rigid and fragile, and further are poor in terms of heat-sealing properties. Thus, cyclic polyolefin polymers have been problematic in that a practical packaging is difficult to be processed with the cyclic polyolefin films of conventional film thickness and thus is coupled with an increased risk of high waste.

Different approaches to circumvent the drawbacks inherent to a cyclic olefin polymer film have been the subject a number of patents and patent applications.

In general, these approaches focus on blending the cyclic olefinic polymer with impact strength modifying (co)polymers, such as elastomeric copolymers.

U.S. Pat. No. 5,468,803 discloses a transparent thermoplastic norbornene polymer composition comprising a thermoplastic norbornene polymer having a number average molecular weight of 10,000-200,000 as determined by gel permeation chromatographic analysis in toluene, said norbornene polymer containing 0.01 to 10% by weight of a compounding ingredient in the form of a polymeric elastomer dispersed as micro-domains in the norbornene polymer.

US 2004/0236024 discloses cycloolefinic polymer compositions exhibiting an advantageous balance of dimensional stability, improved impact resistance and superior optical properties comprising at least one cycloolefinic polymer comprising at least one cyclic mer and at least one acyclic mer, and at least one non-halogenated elastomeric copolymer comprising at least one aromatic vinyl mer and at least one saturated alkene mer, said elastomeric copolymer having an aromatic vinyl content of from 14 to 39 weight percent.

U.S. Pat. No. 6,090,888 discloses a composition blend which essentially consists of (i) a copolymer of norbornene and an acyclic olefin in a respective molar ratio of 1:1 and (ii) effective amounts of a styrene-butadiene-styrene copolymer modifier having up to 50 weight percent styrene content.

US 2011/0256373 discloses a melt-blend resin composition prepared by melt-blending from 60 parts to 94.5 parts by weight of an amorphous cyclic olefin polymer composition exhibiting a glass-transition temperature in the range of from 30° C. to 200° C.; from 30-5 parts by weight of a thermoplastic elastomer; and (c) from 10 parts to 0.5 parts by weight of a partially crystalline, cyclic olefin elastomer of norbornene and ethylene having a glass-transition temperature of less than 30° C., a crystalline melting temperature of less than 125° C. and a percentage crystallinity by weight of 40% or less.

US 2012/0071605 discloses a polymer composition comprising a blend comprising: (a) greater than 30% by weight of a cyclic olefin polymer having a glass-transition temperature (Tg) greater than 60° C. and having a heat of fusion ($\Delta$Hf) of 40 J/g or less; (b) from 1 to 50% by weight of an acyclic olefin polymer modifier having a glass-transition temperature of less than 0° C.; (c) from 0.1 to 50% by weight of a non-functionalized plasticizer having a kinematic viscosity at 100° C. of 3 to 3000 cSt, a viscosity index of 120 or more, a pour point of 0° C. or less and a flash point of 200° C. or more.

US 2015/0259485 discloses a cyclic olefin resin film comprising a cyclic olefin resin having a refractive index of n1 and a glass-transition point of 170° C. or more, and at least one styrene-based elastomer having a refractive index of n2 so that $\Delta n=|n2-n1|$ is 0.012 or less, wherein the at least one styrene-based elastomer has a melt index smaller than that of the cyclic olefin resin at 270° C. and at a load of 2.16 kg. The heat-resistant transparent film may contain two or more kinds of styrene elastomers, and the cyclic olefin resin may be a copolymer of norbornene and ethylene.

Film rigidity and inflexibility cause problems such as poor handling during processing of a multilayer film comprising a cyclic olefin polymer layer coupled with an increased risk of high waste.

Unfortunately, blends of cyclic olefin polymers and impact strength modifying polymers in general result in a layer with reduced chemical inertness and characterized by a too-high peel strength, when heat-sealed on a cyclic olefin polymer comprising layer. Additionally, these blends do not allow to get a smooth opening upon peeling with all kinds of visual disruptions in the sealant area originating from the uncontrolled breaking of the cyclic olefin polymer comprising layer.

AIM OF THE INVENTION

The present invention aims to provide a multilayer film comprising a seal layer based on cyclic olefin polymer that does not present the drawbacks of the cyclic olefin polymer seal layer of the prior art.

It is another aim of the present invention to provide a seal layer based on cyclic olefin polymer(s) characterized by a reduced elasticity modulus and tensile strength at break, enabling a trouble-free production of a multilayer film comprising a seal layer with reduced thickness, said cyclic olefin polymer based seal layer allowing a controlled peel-force of the multilayer film leaving a smooth peel area upon opening, said seal layer further being characterized by a satisfying chemical inertness.

SUMMARY OF THE INVENTION

The present invention discloses a heat-sealable multilayer packaging film comprising:
- a support layer and
- a peelable seal layer comprising a polymer blend, said polymer blend comprising:
  - from 40 to 85% by weight, preferably from 45 to 80% by weight of one or more first amorphous cyclic olefin polymer(s) characterized by a glass-transition temperature of at least 120° C., preferably of at least 130° C.;
  - from 10 to 55% by weight, preferably from 15 to 50% by weight of one or more second amorphous cyclic olefin polymer(s) characterized by a glass-transition temperature of less than 120° C., preferably of less than 110° C.; and
  - from 0.5 to 15% by weight, preferably 0.5 to 10% by weight of at least one elastomeric copolymer comprising at least one polymerized monovinylarene and at least one polymerized acyclic olefin, wherein the monovinylarene content is up to 50% by weight and characterized by a Shore A hardness (30 sec), according to ASTM D 2240, comprised between 20 and 90;
the glass-transition temperature being measured by differential scanning calorimetry, according to ASTM D3418 with a heating gradient of 10° C./min.

Preferred embodiments of the present invention disclose one or more of the following features:
- the first amorphous cyclic olefin polymer(s) of the peelable seal layer is characterized by an elongation at break, in accordance with EN ISO 527, of 30% or less, preferably of 20% or less;
- the second amorphous cyclic olefin polymer(s) of the peelable seal layer is characterized by an elongation at break, in accordance with EN ISO 527, of more than 30%, preferably of more than 40%;
- the cyclic olefin polymer is hydrogenated;
- the elastomeric copolymer is selected from the group consisting of styrene-isobutylene-styrene copolymer, styrene-ethylene-butylene-styrene copolymer, styrene-propylene-styrene copolymer, styrene-ethylene-propylene-styrene copolymer, styrene-isoprene copolymer, styrene-isoprene-styrene copolymer, styrene-isoprene-butadiene-styrene copolymer, styrene-isoprene-butadiene-styrene copolymer, styrene-butylene-butadiene-styrene copolymer and styrene-butadiene-styrene copolymer;
- the elastomeric copolymer is hydrogenated;
- the support layer comprises at least one polymer layer selected from the group consisting of polyamide, polyester, polycarbonate, polyvinyl chloride, polypropylene, polyethylene, polyester-glycol copolymer and ethylene vinyl acetate;
- the thickness of the seal layer is comprised between 3 and 100 μm, preferably between 5 and 80 μm, more preferably between 7 and 50 μm, most preferably between 10 and 30 μm;
- the seal layer is characterized by a stress at break, according to ASTM D882, of 65 N/mm$^2$ or less, preferably of 60 N/mm$^2$ or less, more preferably of 55 N/mm$^2$ or less;
- the seal layer is characterized by a modulus of elasticity, according to ASTM D882, of 2100 N/mm$^2$ or less, preferably of 2000 N/mm$^2$ or less.

The present invention further discloses a package comprising the heat-sealable multilayer packaging film and a multi- or monolayer substrate, comprising at least one cyclic olefin polymer layer in contact with the peelable seal layer of the heat-sealable multilayer film, heat-sealed on it.

Preferred embodiments of the package of the present invention disclose one or more of the following features:
- the peel strength, measured according to ASTM F88, is comprised between 1.0 and 15.0 N/15 mm, preferably between 2.0 and 10.0 N/15 mm.
- the package is sterilizable at 115° C. for 30 minutes or more, or at 121° C. for 15 minutes or more, or at 130° C. for 10 minutes or more.

The present invention further discloses a method for producing the heat-sealed package comprising:
- contacting the mono or multilayer substrate with the heat-seal layer of the heat-sealable multilayer film and:
- sealing at a temperature comprised between 200 and 250° C., preferably between 210 and 240° C. using a dwell time comprised between 0.2 and 3 seconds, preferably between 0.5 and 2 seconds and a pressure comprised between 100 and 500 kPa, preferably between 150 and 250 kPa, and cooling the heat-sealed package.

DETAILED DESCRIPTION OF THE INVENTION

According to the present invention, there is provided a heat-sealable multilayer film comprising a support layer and a peelable seal layer of a polymer blend comprising a first cyclic olefin polymer, a second cyclic olefin polymer and at least one elastomeric copolymer, said elastomeric copolymer comprising at least one polymerized monovinylarene and at least one polymerized acyclic olefin, said peelable seal layer allowing a controlled peel-force of the multilayer film and a smooth peel area upon opening, said peelable seal layer further being characterized by a satisfying chemical inertness and resistance to penetration of substances.

The peelable seal layer of the present invention comprises a polymer blend comprising:
- from 40 to 85% by weight, preferably from 45 to 80% by weight of one or more first amorphous cyclic olefin polymer(s) characterized by a glass-transition temperature of at least 120° C. and an elongation at break of 30% or less;
- from 10 to 55% by weight, preferably from 15 to 50% by weight of one or more amorphous cyclic olefin polymer(s) characterized by a glass-transition temperature of less than 120° C. and an elongation at break of more than 30%; and
- from 0.5 to 15% by weight of at least one elastomeric copolymer comprising at least one polymerized monovinylarene and at least one polymerized acyclic olefin, wherein the monovinylarene content is up to 50% by weight and characterized by a Shore A hardness (30 sec) according to ASTM D 2240 comprised between 20 and 90, wherein the glass-transition temperature is measured by differential scanning calorimetry, according to ASTM D3418 with a heating gradient of 10° C./min. and the elongation at break is determined by tensile testing in accordance with EN ISO 527.

Suitable cyclic olefin polymers for being used in the polymer blend of the peelable seal layer of the present invention include homopolymers or copolymers of any cyclic olefin monomers known in the art.

The cyclic olefin monomers in general are mono- or polyunsaturated polycyclic ring systems, such as cycloalkenes, bicycloalkenes, tricycloalkenes, tetracyclo-alkenes, pentacycloalkenes and hexacycloalkenes which may be mono- or polysubstituted.

Non-limiting examples of suitable cyclic olefin monomers include bicyclo[2,2,1]hept-2-ene, 5-methylbicyclo[2,2,1]hept-2-ene, 10-methyltricyclo[4.4.0.1$^{2,5}$]-3-undecene, tetracyclo[4.4.0.1$^{2,5}$.1$^{7,10}$]-3-dodecene, 8-methyltetracyclo [4.4.0.1$^{2,5}$.1$^{7,10}$]-3-dodecene, pentacyclo[7.4.0.1$^{2,5}$.1$^{9,12}$.0$^{8,13}$], hexacyclo[6.6.1.1$^{3,6}$.1$^{10,13}$.0$^{2,7}$.0$^{9,14}$]-4-hepta-decene and tricyclo[5.2.1.0$^{2,6}$]deca-3,8-diene.

The cyclic olefin polymers are produced by ring-opening metathesis polymerization of one or more cyclic olefin monomers.

The cyclic olefin polymers for being used in the polymer blend of the peelable seal layer of the present invention preferably comprise hydrogenated homopolymers or copolymers of bicyclo[2,2,1]hept-2-ene, 8-methyltetracyclo [4.4.0.1$^{2,5}$.1$^{7,10}$]-3-dodecene and tricyclo[5.2.1.0$^{2,6}$] deca-3,8-diene.

Preferably, the cyclic olefin polymer is hydrogenated. When an unsaturated bond remaining in the molecular chain of cyclic polyolefin is saturated by hydrogenation, the hydrogenation rate is preferably 90% or more, more preferably 95% or more, and particularly preferably 99% or more.

The cyclic olefin polymer is preferably characterized by a number average molecular weight comprised between 10,000 and 200,000, preferably between 20,000 and 100,000, more preferably between 25,000 and 50,000 g/mole, measured by gel permeation chromatography using toluene as a solvent, relative to polystyrene.

The vinyl aromatic elastomeric copolymer used in the polymer blend of the peelable seal layer of the present invention is preferably a block polymer in which the aromatic portion is a polymer of styrene, α-methylstyrene, (o-, m-, p-)methylstyrene or 1,3-dimethylstyrene and preferably a polymer of styrene, and wherein the elastomeric portion is an unsaturated polymer of butadiene and/or isoprene, or the hydrogenated derivative thereof, or a saturated olefin polymer of ethylene/butylene or ethylene/propylene.

The vinyl aromatic elastomer is preferably characterized by a weight average molecular weight comprised between 20,000 and 500,000, preferably between 30,000 and 450,000, more preferably between 50,000 and 400,000 g/mole, measured by gel permeation chromatography using toluene as a solvent, relative to polystyrene.

Preferably, the vinyl aromatic elastomer is hydrogenated. When an unsaturated bond remaining in the molecular chain of vinyl aromatic elastomer is saturated by hydrogenation, the hydrogenation rate is preferably 90% or more, more preferably 95% or more, and particularly preferably 99% or more The vinyl aromatic elastomer is preferably selected from the group consisting of styrene-isobutylene-styrene copolymer, styrene-ethylene-butylene-styrene copolymer, styrene-propylene-styrene copolymer, styrene-ethylene-propylene-styrene copolymer, hydrogenated styrene-isoprene copolymer, hydrogenated styrene-isoprene-styrene copolymer, hydrogenated styrene-isoprene-butadiene-styrene copolymer, hydrogenated styrene-isoprene-butadiene-styrene copolymer, hydrogenated styrene-butylene-butadiene-styrene copolymer and hydrogenated styrene-butadiene-styrene copolymer.

More preferably, the vinyl aromatic elastomer is styrene-ethylene-butylene-styrene copolymer (SEBS) or styrene-ethylene-propylene-styrene copolymer (SEPS).

The vinyl aromatic elastomer is characterized by a vinyl aromatic content of up to 50% by weight and by a Shore A hardness (30 sec.) according to ASTM D 2240 comprised between 20 and 90, preferably between 30 and 80.

The inventors have found that the particular combination of cyclic olefin polymers and vinyl aromatic polymer(s) allow the realization of a polymer blend characterized by an elasticity modulus, according to ASTM D882, of 2100 N/mm$^2$ or less, preferably of 2000 N/mm$^2$ or less and a stress at break, according to ASTM D882, of 65 N/mm$^2$ or less, preferably of 60 N/mm$^2$ or less, more preferably of 55 N/mm$^2$ or less.

The inventors have surprisingly found that both the elasticity modulus and the stress at break of the intimate polymer blend of the present invention, are lower than the theoretical value based on the proportional contribution of the respective values of the first cyclic olefin polymer and of the blend of the second cyclic olefin polymer and the vinyl aromatic elastomer, constituting the seal layer, i.e. lower than the theoretical elasticity modulus or stress at break calculated from the sum of the elasticity modulus or the stress at break of a 100% first cyclic olefin polymer layer, multiplied by its weight fraction as in the seal layer of the present invention, and of the elasticity modulus or the stress at break of a layer consisting of an intimate blend of the second cyclic olefin polymer and the vinyl aromatic polymer, in the ratio as in the seal layer of the present invention, multiplied by the weight fraction of the second olefin polymer and the vinyl aromatic elastomer as in the seal layer of the present invention, wherein the weight fraction equals the weight percentage divided by 100.

The thickness of the peelable seal layer is in general comprised between 3 and 100 μm, preferably between 5 and 80 μm, more preferably between 7 and 50 μm, most preferably between 10 and 30 μm.

The heat-sealable multilayerfilm of the present invention comprises a support layer, said support layer preferably comprising at least one polymer layer selected from the group consisting of polyamide, polyester, polycarbonate, polyvinyl chloride, polypropylene, low density polyethylene, medium density polyethylene, high density polyethylene, polyester-glycol copolymer and ethylene vinyl acetate.

The support layer may further comprise one or more ceramic-coated films like AlO$_x$ or SiO$_x$-coated polymer films or a metal foil like an aluminum foil.

Multilayer films in accordance with the present invention can be produced by known methods. However, it is generally preferred to produce them by coextruding melts of the polymers and additives required for the various layers of the final films, followed by cooling to solidify the polymers in the form of a film.

Films in accordance with the present invention can also be produced by coextrusion coating of the heat-seal layer on to a suitable support layer.

The support layer of the multilayer packaging film of the present invention typically comprises a polyester layer, such as a polyethylene terephthalate layer, with a thickness comprised between 5 and 60 μm, preferably between 10 and 40 μm; an aluminum foil with a thickness comprised between 20 and 70 μm, preferably between 30 and 60 μm and the peelable seal layer with a thickness comprised between 10 and 30 µm, most preferably between 15 and 25 µm.

The heat-sealable multilayer film of the present invention is used for the production of peelable heat-sealed packages through heat sealing said multilayer film to a substrate wherein the substrate is a cyclic olefin polymer substrate or comprises a cyclic olefin polymer layer for contacting the peelable seal layer upon heat sealing.

The heat-sealable multilayer film of the present invention may be used for the production of peelable heat-sealed packages through heat sealing said multilayer film to a substrate at a temperature comprised between 200 and 250° C., preferably between 210 and 240° C. using a dwell time comprised between 0.2 and 3 seconds, preferably between 0.5 and 2 seconds, and a pressure comprised between 100 and 500 kPa, preferably between 150 and 250 kPa.

Peelable packages produced from the multilayer films and the cyclic olefin comprising substrate have shown peel strengths, for separating the multilayer film and the substrate, measured according to ASTM F88, comprised between 1.0 and 15.0 N/15 mm, preferably between 2.0 and 10.0 N/15 mm. Peeling strengths are measured with an Instron tensile tester at a 180° peel angle with an opening speed of 300 mm/min.

The inventors have surprisingly found that the peel strength of the package, of the present invention, is lower than the theoretical peel-strength value calculated from the proportional contribution of the respective peel-strength values of a seal layer of the first cyclic olefin polymer and of a seal layer consisting of a blend of the second cyclic olefin polymer and the vinyl aromatic elastomer, wherein the proportions are as in the seal layer of the present invention; i.e. lower than the theoretical peel strength calculated from the sum of the peel strength of a 100% first cyclic olefin polymer seal layer, multiplied by its weight fraction as in the seal layer of the present invention, and of the peel strength of a seal layer consisting of an intimate blend of the second cyclic olefin polymer and the vinyl aromatic polymer, in the ratio as in the seal layer of the present invention, multiplied by the weight fraction of the second olefin polymer and the vinyl aromatic elastomer as in the seal layer of the present invention, wherein the weight fraction equals the weight percentage divided by 100.

Both phenomena, the anti-synergistic effect of blending the first cyclic olefin polymer, the second olefin polymer and the vinyl aromatic elastomer on the mechanical properties (elasticity modulus and tensile strength at break) and on the force to open a package, allow to create a thin cyclic olefin polymer-based heat-seal layer with a film thickness below 100 µm, preferably below 60 µm, more preferably below 40 µm, that are easily processable on blown and cast extrusion lines without web breakages, while having controlled peel forces resulting in clean peels without fiber tears or angel hairs implying that the peel trace is smooth and exempt from all kind of visual disruptions.

Packages processed by heat sealing the multilayer film of the present invention on a cyclic olefin polymer surface of the substrate have proven to be resistant to penetration of substances enclosed in the package, into the cyclic olefin polymer matrix, i.e. the packages have proven non-scalping properties, assuming that the contents of the packaging are into direct contact with the cyclic olefin polymer.

By substances, the present invention means flavor and aroma substances and pharmaceutical agents or parts thereof.

The packages according to the present invention can preferably be sterilized at 115° C. for 30 minutes or more.

In another preferred embodiment, the packages according to the present invention can be sterilized at 121° C. for 15 minutes or more.

EXAMPLES

The following illustrative examples are merely meant to exemplify the present invention but are not destined to limit or otherwise define the scope of the present invention.

Peelable layer was prepared from a polymer blend comprising the first cyclic olefin polymer Zeonor® 1430R, characterized by a glass-transition temperature of 136° C. and an elongation at break of 16%, the second cyclic olefin polymer Zeonor® 1020R characterized by a glass-transition temperature of 102° C. and an elongation at break of 90%, and the vinyl aromatic elastomer Kraton® G1643M characterized by a styrene content of 20% by weight and a Shore A hardness (30 sec) of 52, in weight percentages as given in Table 1.

The glass-transition temperature was determined with the Q200 DSC from TA Instruments, according to ASTM D3418. Samples were heated to 220° C. with a speed of 50° C./min in the first run followed by a cooling step to −20° C. at 10° C./min. The glass-transition temperature was measured during the second heating cycle with a speed of 10° C./min.

A 30-µm film was produced on 3-layer 600 mm wide cast line equipped with a Chloeren combining system and two 45 mm and one 60 mm Egan-Davis standard extruders. Prior to extrusion, all polymers were pre-dried to remove air and oxygen to prevent discoloration, carbide formation and voids in the film. Additionally, $N_2$ was added to the extruder hopper and the extrusion feeding section.

Elasticity modulus and stress at break were measured on pure films according to ASTM D882 and are reproduced in Table 1. The film dimensions for testing were 125 mm length and 15 mm width. The pull velocity of the clamps was 25 mm/min. A load cell of 250 N was applied.

Prior to sealing, the peelable layer was adhesively laminated against a OPET 12 µm/aluminum foil 50 µm laminate to form multilayerfilm. The multilayerfilm was sealed on the multilayer film; sealing was performed with peelable layer against peelable layer with a Kopp sealer using 400 N/20 $cm^2$ pressure during 1 sec and with one heated seal bar at a temperature of 220° C. and 230° C., respectively. Films were sealed in machine direction and opened in cross direction at a pull velocity of the tensile tester of 300 mm/min. Sample widths of 15 mm were applied. Peel-strength values, according to ASTM F88, are reproduced in Table 1.

The peel aspect is visually evaluated, wherein (+) stands for fiber tears and angel hairs observed over the complete surface of the peel; (++) stands for a few angel hairs observed over part of the surface of the peel; and (+++) stands for a complete intact peel surface.

Samples of the extruded films are cut and sealed into pouches with the dimensions of 10×10 cm. A 25 mg Nicorette™ patch of 22.5 $cm^2$ is put on the inside of the pouch prior to close sealing. The pouch is stored in an oven at 60° C. during 24 h. After opening the pouch, the nicotine absorbed in the 22.5 $cm^2$ film, in direct contact with the patch, is put in a tube containing a 4 ml ethanol/hexane (50/50) solution. The solution is stirred in an ultrasonic bath during 30 min. The nicotine content is quantified by GC coupled with a flame ionization detector (FID). The FID uses a hydrogen/air flame into which the sample is passed. In the flame, the nicotine is further oxidized into electricallycharged particles. The ions are collected and create an electrical signal proportional to the concentration of nicotine.

The quantity of nicotine, in μg, penetrated into the seal layer is reproduced in Table 1. By way of comparison, the nicotine quantity of an oriented polypropylene film of the same dimension, under identical conditions equals 562 μg/22.5 cm².

TABLE 1

| 1     | 2%  | 3%   | 4%  | 5 N/mm² | 6 N/mm² | 7 N/15 mm | 8 N/15 mm | 9 Eval. | 10 μg/22.5 cm² |
|-------|-----|------|-----|---------|---------|-----------|-----------|---------|----------------|
| Ex. 1 | 100 | 0.0  | 0.0 | 2200    | 66      | 1.9       | 7.2       |         | 23.9           |
| Ex. 2 | 80  | 19.0 | 1.0 | 1940    | 55      | 2.5       | 7.6       | ++      | 16.4           |
| Ex. 3 | 65  | 33.5 | 1.5 | 1883    | 46      | 3.2       | 10.6      | ++      | 18.1           |
| Ex. 4 | 50  | 48.0 | 2.0 | 1657    | 42      | 5.2       | 13.5      | +++     | 13.7           |
| Ex. 5 | 0   | 95.0 | 5.0 | 1595    | 33      | 15.9      | 24.9      | +++     | 13.8           |

Example 1 and 5 are comparative examples. Example 1 only has a first polymeric cyclic olefin and the peel gives angel hairs. Example 5 only uses a second cyclic olefin polymer and an elastomer leading to a glass-transition temperature lower than usual sterilization temperatures, additionally to too-high peel-strength values (too high opening forces).

Key
1. examples
2. weight percentage of the first cyclic olefin polymer (Zeonor® 1430R)
3. weight percentage of the second cyclic olefin polymer (Zeonor® 1020R)
4. weight percentage of the vinyl aromatic elastomer (Kraton® G1643M)
5. elasticity modulus, in N/mm², according to ASTM D882
6. stress at break, in N/mm², according to ASTM D882
7. peel strength, according to ASTM F88, in N/15 mm, for a sealing temperature of 220° C.
8. peel strength, according to ASTM F88, in N/15 mm, for a sealing temperature of 230° C.
9. visual evaluation of the peel region
10. nicotine uptake of the heat-seal layer in μg/22.5 cm²

The invention claimed is:

1. A heat-sealable multilayer packaging film comprising:
a support layer comprising at least one polymer layer selected from the group consisting of polyamide, polyester, polycarbonate, polyvinyl chloride and polyester-glycol copolymer, and
a peelable seal layer comprising a polymer blend, said polymer blend comprising:
from 40 to 85% by weight of one or more first amorphous cyclic olefin polymer(s) characterized by a glass-transition temperature of at least 120° C.;
from 10 to 55% by weight of one or more second amorphous cyclic olefin polymer(s) characterized by a glass-transition temperature of less than 120° C.; and
from 0.5 to 15% by weight of at least one elastomeric copolymer comprising at least one polymerized monovinylarene and at least one polymerized acyclic olefin,
wherein the monovinylarene content is up to 50% by weight and characterized by a Shore A hardness (30 sec), according to ASTM D 2240, between 20 and 90;
the glass-transition temperature being measured by differential scanning calorimetry, according to ASTM D3418 with a heating gradient of 10° C./min.

2. The heat-sealable multilayer packaging film according to claim 1, characterized in that:
the first amorphous cyclic olefin polymer of the peelable seal layer is characterized by an elongation at break of 30% or less, and
the second amorphous cyclic olefin polymer of the peelable seal layer is characterized by an elongation at break of more than 30%,
the elongation at break being determined by tensile testing in accordance with EN ISO 527.

3. The heat-sealable multilayer packaging film according to claim 1, characterized in that the cyclic olefin polymer is hydrogenated.

4. The heat-seal able multilayer packaging film according claim 1, characterized in that the elastomeric copolymer is selected from the group consisting of styrene-isobutylene-styrene copolymer, styrene-ethylenebutylene-styrene copolymer, styrene-propylene-styrene copolymer, styreneethylene-propylene-styrene copolymer, styrene-isoprene copolymer, styreneisoprene-styrene copolymer, styrene-isoprene-butadiene-styrene copolymer, styrene-isoprene-butadiene-styrene copolymer, styrene-butylene-butadienestyrene copolymer and styrene-butadiene-styrene copolymer.

5. The heat-sealable multilayer packaging film according to claim 2, characterized in that the elastomeric copolymer is selected from the group consisting of styrene-isobutylene-styrene copolymer, styrene-ethylenebutylene-styrene copolymer, styrene-propylene-styrene copolymer, styreneethylene-propylene-styrene copolymer, styrene-isoprene copolymer, styreneisoprene-styrene copolymer, styrene-isoprene-butadiene-styrene copolymer, styrene-isoprene-butadiene-styrene copolymer, styrene-butylene-butadienestyrene copolymer and styrene-butadiene-styrene copolymer.

6. The heat-sealable multilayer packaging film according to claim 1, characterized in that the elastomeric copolymer is hydrogenated.

7. The heat-sealable multilayer packaging film according to claim 1, characterized in that the peelable seal layer has a thickness of between 3 and 100 μm.

8. The heat-sealable multilayer packaging film according to claim 1, characterized in that the peelable seal layer is characterized by a stress at break, according to ASTM D882, of 65 N/mm² or less.

9. The heat-sealable multilayer packaging film according to claim 1 wherein the peelable seal layer is characterized by a modulus of elasticity, according to ASTM D882, of 2100 N/mm² or less.

10. A package comprising the heat-sealable multilayer packaging film according to claim 1, and a multi- or mono-layer substrate, comprising at least one cyclic olefin polymer layer in contact with the peelable seal layer of the heat-sealable multilayer film upon heat sealing.

11. The package according to claim 10, characterized in that a peel strength for separating the heat-sealable multi-layer film and the substrate, measured according to ASTM F88, is between 1.0 and 15.0 N/15 mm.

12. The package according to claim 10, characterized in that said package is sterilizable at 115° C. for 30 minutes or more.

* * * * *

UNITED STATES PATENT AND TRADEMARK OFFICE
CERTIFICATE OF CORRECTION

| | |
|---|---|
| PATENT NO. | : 11,794,453 B2 |
| APPLICATION NO. | : 17/058072 |
| DATED | : October 24, 2023 |
| INVENTOR(S) | : Ingeborg Verlodt and Tony Malfait |

It is certified that error appears in the above-identified patent and that said Letters Patent is hereby corrected as shown below:

In the Specification

Column 9, in TABLE 1, at Ex. 1 and Column 9 Eval., insert -- + --, therefor.

Signed and Sealed this
Third Day of December, 2024

Katherine Kelly Vidal
*Director of the United States Patent and Trademark Office*